United States Patent
Saito et al.

(10) Patent No.: US 12,326,228 B2
(45) Date of Patent: Jun. 10, 2025

(54) LIGHT-EMITTING UNIT AND VEHICULAR LAMP

(71) Applicant: Stanley Electric Co., Ltd., Tokyo (JP)

(72) Inventors: Kenichi Saito, Tokyo (JP); Kazuhiko Ueno, Tokyo (JP); Sumihisa Furufuji, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/555,774

(22) PCT Filed: Apr. 5, 2022

(86) PCT No.: PCT/JP2022/017096
§ 371 (c)(1),
(2) Date: Oct. 17, 2023

(87) PCT Pub. No.: WO2022/224816
PCT Pub. Date: Oct. 27, 2022

(65) Prior Publication Data
US 2024/0210004 A1    Jun. 27, 2024

(30) Foreign Application Priority Data

Apr. 23, 2021    (JP) .................................. 2021-073000

(51) Int. Cl.
*F21S 41/265*    (2018.01)
*B60Q 1/34*    (2006.01)
(Continued)

(52) U.S. Cl.
CPC .............. *F21S 41/265* (2018.01); *B60Q 1/34* (2013.01); *F21S 43/245* (2018.01); *F21W 2103/20* (2018.01); *F21W 2103/60* (2018.01)

(58) Field of Classification Search
CPC ..... B60Q 2400/50; B60Q 1/34; F21S 41/265; F21S 41/245; F21S 41/239
See application file for complete search history.

(56) References Cited

U.S. PATENT DOCUMENTS 10,829,036 B2 *  11/2020  Sugiyama ............... F21S 43/14
10,928,029 B1 *   2/2021  Woo ......................... B60Q 1/34
(Continued)

FOREIGN PATENT DOCUMENTS

JP    2016-193689 A    11/2016
JP    2020-102332 A     7/2020
(Continued)

OTHER PUBLICATIONS

International Search Report for PCT/JP2022/017096 dated May 17, 2022.
(Continued)

*Primary Examiner* — Matthew J. Peerce
(74) *Attorney, Agent, or Firm* — KENEALY VAIDYA LLP

(57) ABSTRACT

A light-emitting unit includes a light source and a lens body disposed in front of the light source, and the lens body includes a projection lens part configured to project a graphic pattern toward a road surface by light emission of the light source, and a light emission lens part configured to cause surrounding of the projection lens part emit light by light emitted from the light source.

11 Claims, 14 Drawing Sheets

(51) Int. Cl.
*F21S 43/245* (2018.01)
*F21W 103/20* (2018.01)
*F21W 103/60* (2018.01)

(56) References Cited

U.S. PATENT DOCUMENTS

| | | | |
|---|---|---|---|
| 10,960,814 B2 * | 3/2021 | Goeke | G02B 27/0101 |
| 2013/0010484 A1 | 1/2013 | Son et al. | |
| 2015/0224919 A1 | 8/2015 | Sobecki et al. | |

FOREIGN PATENT DOCUMENTS

| | | | | |
|---|---|---|---|---|
| JP | 2020-205237 A | | 12/2020 | |
| JP | 2021-009772 A | | 1/2021 | |
| JP | 2021034309 A | * | 3/2021 | B60Q 1/34 |
| KR | 10-2015-0131787 A | | 11/2015 | |

OTHER PUBLICATIONS

Extended European Search Report for the related European Patent Application No. 22791591.5 dated Mar. 31, 2025.

* cited by examiner

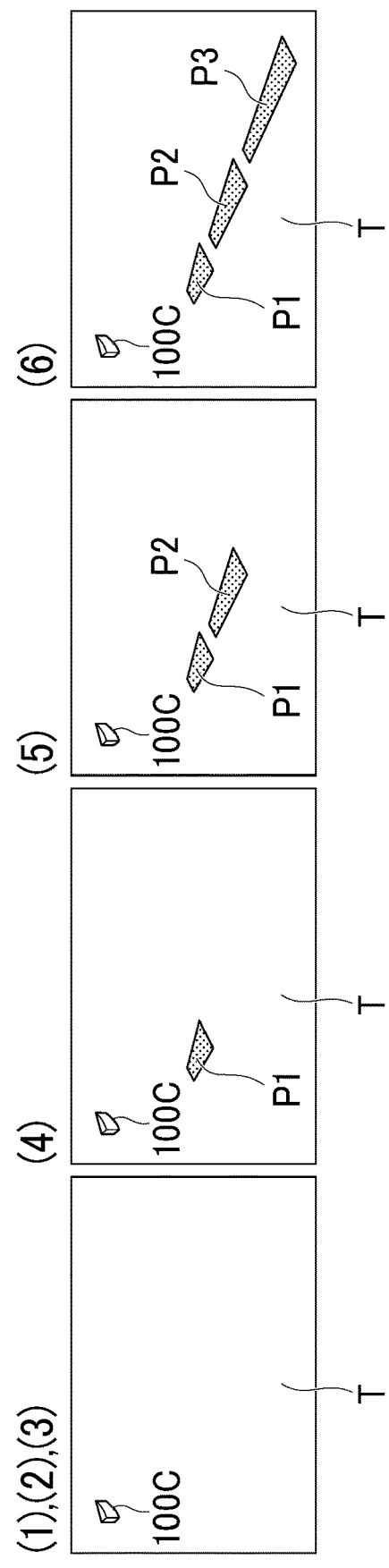

LIGHT-EMITTING UNIT AND VEHICULAR LAMP

PRIORITY AND INCORPORATION BY REFERENCE

This application is a U.S. National Stage Application under 35 U.S.C § 371 of International Patent Application No. PCT/JP2022/017096 filed Apr. 5, 2022, which claims the benefit of priority under 35 U.S.C. § 119 to Japanese Patent Application No. 2021-073000, filed Apr. 23, 2021, the content of which is incorporated herein by reference.

TECHNICAL FIELD

The present invention relates to a light-emitting unit and a vehicular lamp.

BACKGROUND ART

In a vehicular lamp, in order to achieve improvement of safety in driving, it has been proposed to perform road surface drawing using light projected toward a road surface separately from light projected toward a side in front of the vehicle (for example, see the following Patent Document 1).

CITATION LIST

Patent Document

[Patent Document 1]
Japanese Unexamined Patent Application, First Publication No. 2021-9772

SUMMARY OF INVENTION

Technical Problem

However, in the vehicular lamp in the related art, since a light-emitting unit for performing the road surface drawing described above needs to be added separately inside the lighting body, this will lead to an increase in the number of parts and an increase in size of a lighting body.

An aspect of the present invention is directed to providing a light-emitting unit having both a function of performing normal light emission and a function of performing road surface drawing, and a vehicular lamp capable of producing a flow of light emission by a plurality of light-emitting units while sequentially lighting the plurality of light-emitting units arranged in a widthwise direction of a vehicle and performing road surface drawing using such a light-emitting unit.

Solution to Problem

In order to achieve the aforementioned objects, the present invention provides the following configurations.

(1) A light-emitting unit including:
a light source; and
a lens body disposed in front of the light source,
wherein the lens body includes:
a projection lens part configured to project a graphic pattern toward a road surface by light emission of the light source; and
a light emission lens part configured to cause surrounding of the projection lens part emit light by light emitted from the light source.

(2) The light-emitting unit according to the above-mentioned (1), wherein the projection lens part projects the graphic pattern which reflects a form caused by the light emitted from the light source toward the road surface.

(3) The light-emitting unit according to the above-mentioned (1) or (2), wherein the projection lens part is constituted by a convex lens, a focal distance of which is adjusted, such that a rear side focus of the convex lens coincides with the light source or a vicinity of the light source.

(4) The light-emitting unit according to the above-mentioned (3), wherein the light emission lens part includes an incident surface that is located on a side facing the light source and that is configured to cause light emitted from the light source to enter thereinto, and a light emission surface that is located on a side opposite to the incident surface and that is configured to emit the light entering from the incident surface to outside, and
the convex lens is provided so as to protrude forward from the side opposite to the incident surface.

(5) The light-emitting unit according to the above-mentioned (4), wherein a light distribution controller configured to control light distribution of light emitted from the light emission surface is provided on at least one of the incident surface and the light emission surface.

(6) The light-emitting unit according to the above-mentioned (4) or (5), wherein at least some of light emitted from the light emission surface is emitted in a direction different from a direction of light emitted from the projection lens part.

(7) The light-emitting unit according to any one of the above-mentioned (4) to (6), wherein a light diffusion part configured to diffuse light emitted from the light emission surface is provided on at least one of the incident surface and the light emission surface.

(8) The light-emitting unit according to any one of the above-mentioned (1) to (7), wherein a plurality of the light sources are disposed in a plane which overlaps the lens body when seen in a front view in a state in which distances from each of the light sources and the lens body are different in order,
a plurality of the projection lens parts are disposed in a surface of the lens body in a state in which a focal distance is adjusted in accordance with each of the light sources, and
a plurality of graphic patterns having different projection distances toward the road surface are projected next to each other.

(9) A vehicular lamp configured to produce a flow of light emission by a plurality of light-emitting units by sequentially lighting a plurality of light-emitting units arranged in a widthwise direction of a vehicle, the vehicular lamp comprising the light-emitting unit according to any one of the above-mentioned (1) to (8),
wherein a lighting operation in which, according to sequential lighting of the plurality of light-emitting units, a plurality of graphic patterns having different projection distances are sequentially projected toward the road surface is repeated.

(10) A vehicular lamp configured to produce a flow of light emission by a plurality of light-emitting units by sequentially lighting the plurality of light-emitting units arranged in a widthwise direction of a vehicle, the vehicular lamp comprising the light-emitting unit according to the above-mentioned (8),
wherein a lighting operation in which, after the plurality of light-emitting units are sequentially lighted, a plurality of graphic patterns having different projection distances are sequentially projected toward the road surface is repeated.

Advantageous Effects of Invention

According to the aspect of the present invention, it is possible to provide a light-emitting unit having both a function of performing normal light emission and a function of performing road surface drawing, and a vehicular lamp capable of producing a flow of light emission by a plurality of light-emitting units while sequentially lighting the plurality of light-emitting units arranged in a widthwise direction of a vehicle and performing road surface drawing using such a light-emitting unit.

BRIEF DESCRIPTION OF DRAWINGS

FIG. 10B is a schematic view showing another example of the configuration and the lighting operation of the vehicular lamp according to the fourth embodiment of the present invention, showing a plurality of graphic patterns projected to a road surface in sequence.

DESCRIPTION OF EMBODIMENTS

Figure 1:
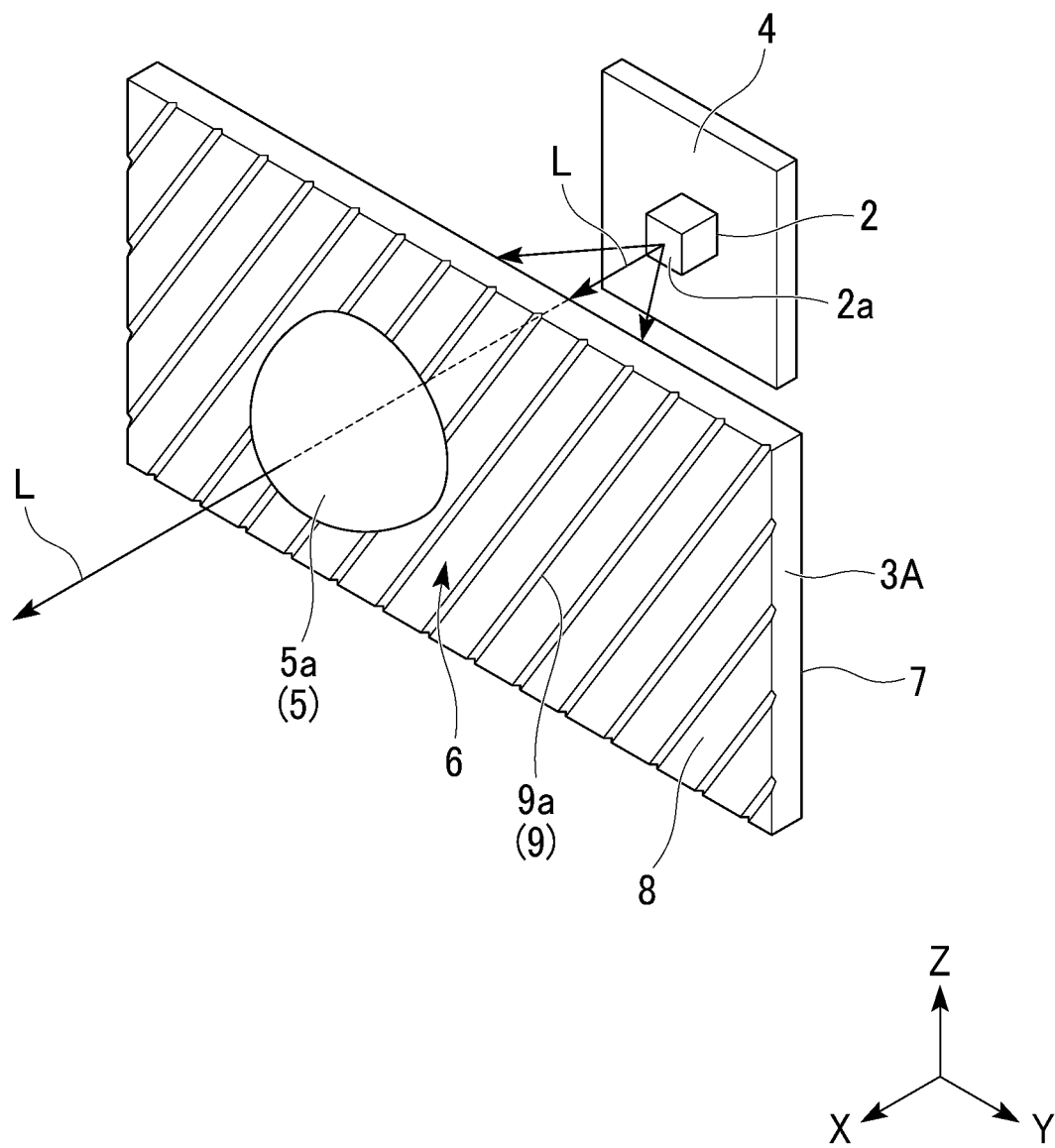
FIG. 1 is a perspective view showing a configuration of a light-emitting unit according to a first embodiment of the present invention.

Hereinafter, embodiments of the present invention will be described with reference to the accompanying drawings.

Further, in the drawings used in the following description, in order to make each component easier to see, a scale of a dimension may be changed depending on the component, and dimensional ratios of each component may not always be the same as the actual ones.

In addition, in the drawings shown as below, an XYZ orthogonal coordinate system is set, an X-axis direction indicates a forward/rearward direction (lengthwise direction) of a light-emitting unit (vehicular lamp), a Y-axis direction indicates a leftward/rightward direction (widthwise direction) of the light-emitting unit (vehicular lamp), and a Z-axis direction indicates an upward/downward direction (height direction) of the light-emitting unit (vehicular lamp).

First Embodiment

First, as a first embodiment of the present invention, for example, a light-emitting unit TA shown in FIG. 1 to FIG. 4B will be described.

Figure 2:
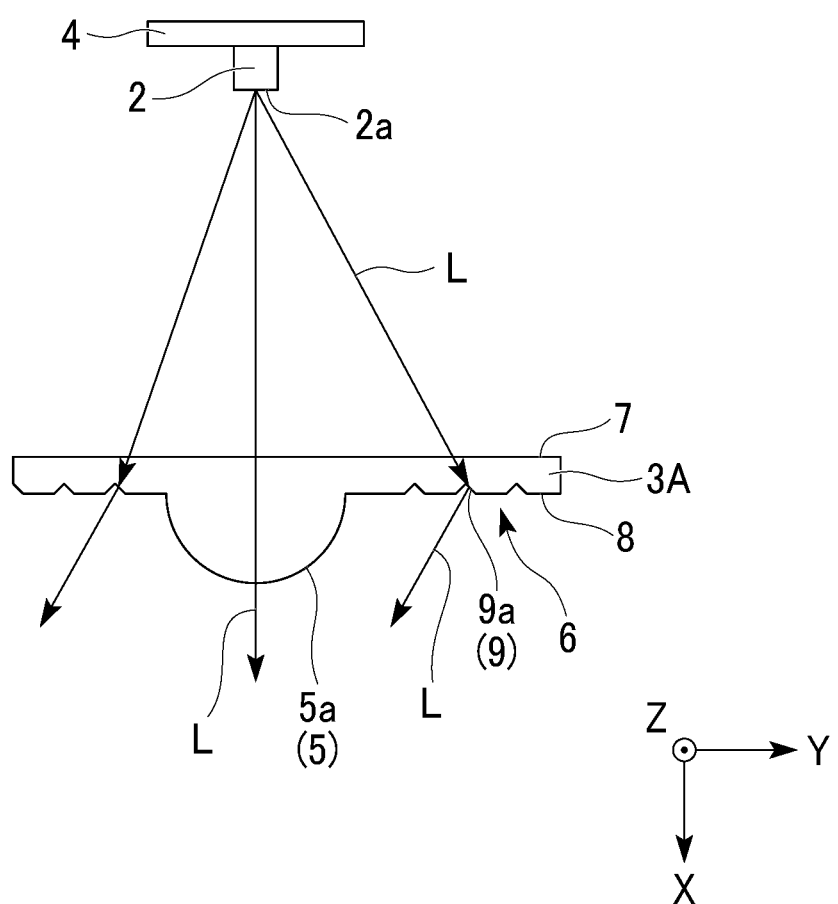
FIG. 2 is a cross-sectional view showing a configuration of the light-emitting unit shown in FIG. 1.
Figure 3A:
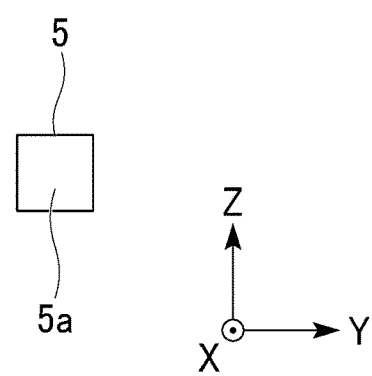
FIG. 3A is a front view showing a form of a light source.
Figure 3B:
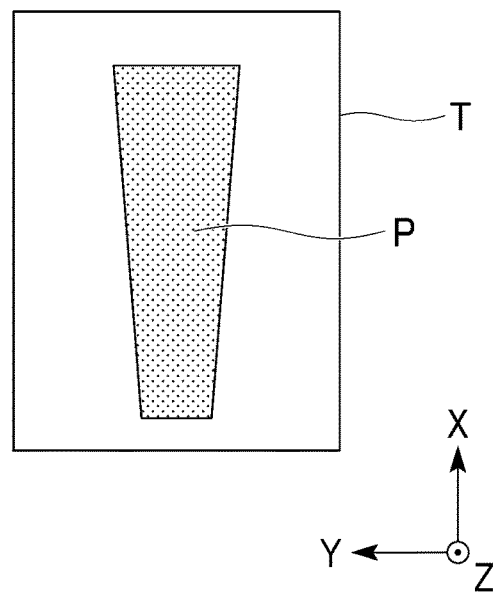
FIG. 3B is a plan view showing a form when a graphic pattern obtained by reflecting a form by light emission of a light source is projected to a road surface.
Figure 3C:
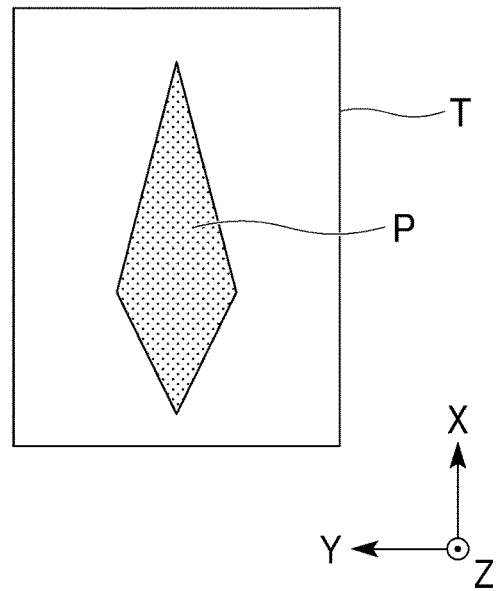
FIG. 3C is a plan view showing another form of a graphic pattern.
Figure 4A:
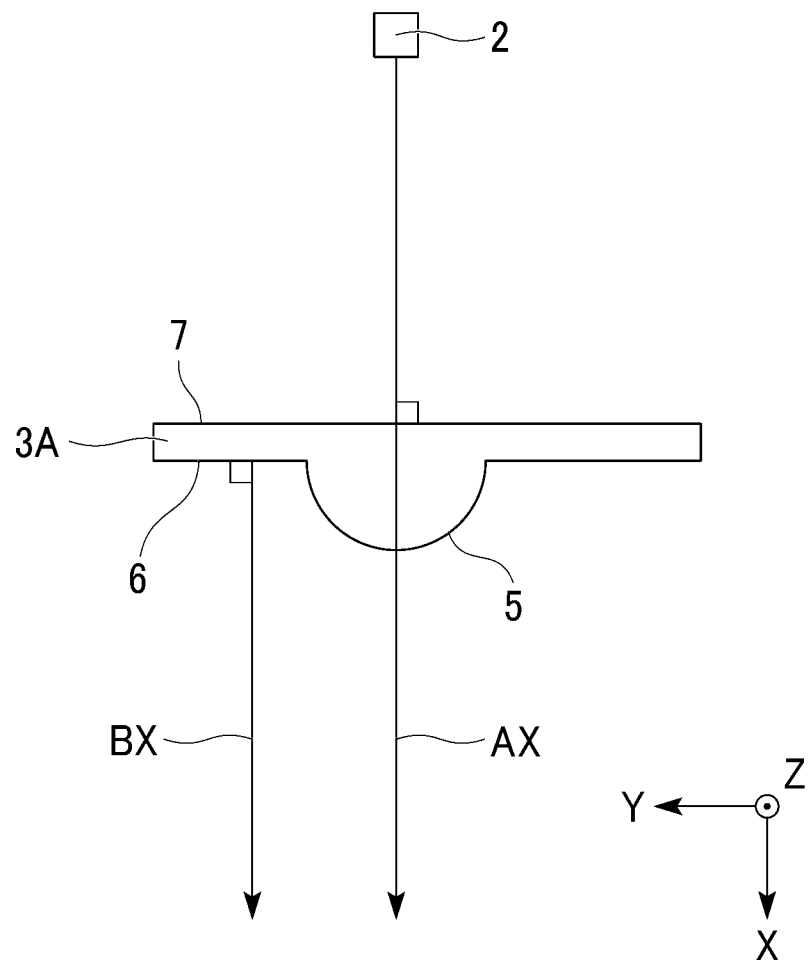
FIG. 4A is a cross-sectional view showing a variant of the light-emitting unit.
Figure 4B:
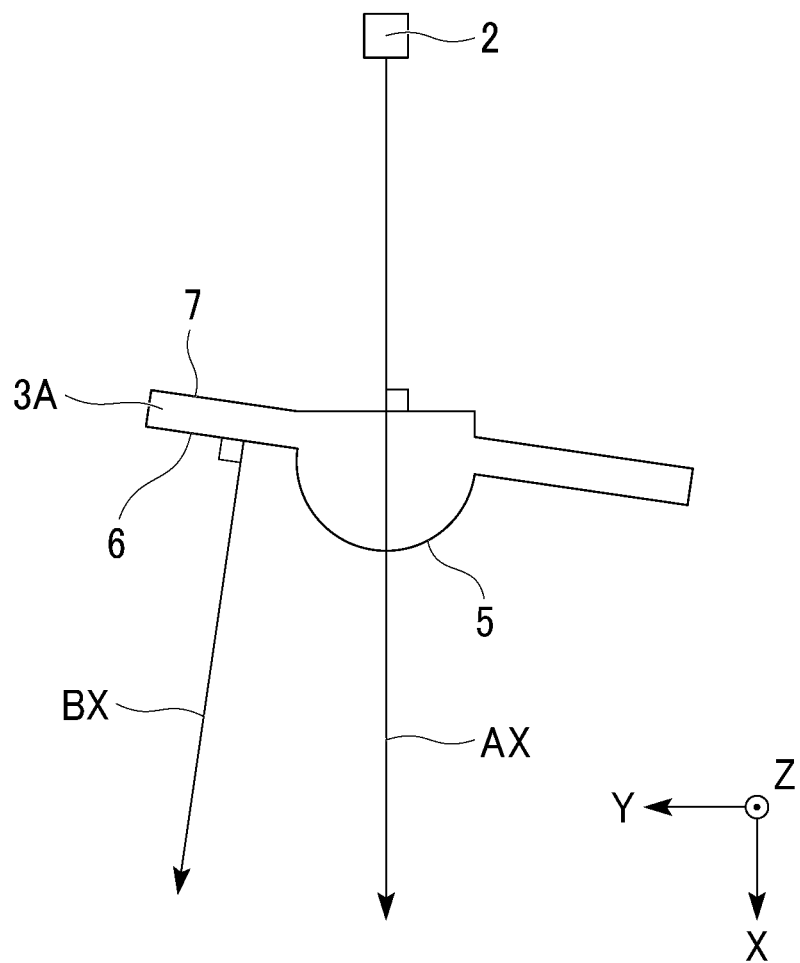
FIG. 4B is a cross-sectional view showing a variant of the light-emitting unit.

Further, FIG. 1 is a perspective view showing a configuration of the light-emitting unit TA. FIG. 2 is a cross-sectional view showing a configuration of the light-emitting unit TA. FIG. 3A is a front view showing a form of a light source 2. FIG. 3B is a plan view showing a form when a graphic pattern P obtained by reflecting a form by light emission of the light source 2 is projected to a road surface. FIG. 3C is a plan view showing another form of the graphic pattern P. FIG. 4A and FIG. 4B are cross-sectional views of a variant of the light-emitting unit 1A.

The light-emitting unit 1 of the embodiment includes, as shown in FIG. 1 and FIG. 2, the light source 2, and a lens body 3A disposed in front of the light source 2.

The light source 2 is constituted by a light emission diode (LED) configured to emit light L. The light source 2 is mounted on the side of one surface (in the embodiment, a front surface) of a circuit board 4 on which a driving circuit configured to drive the LED is provided. In addition, the circuit board 4 is disposed in a state in which the one surface is directed forward (toward a +X axis side). Accordingly, the light source 2 emits the light L radially forward (toward the +X axis side).

Further, while the circuit board 4 may have a configuration in which a driving circuit configured to drive the LED is provided, the circuit board 4 may have a configuration in which a mounting board on which an LED is provided and a circuit board on which a driving circuit is provided are separately disposed, the mounting board and the circuit board are electrically connected via a wiring cord referred to as a harness, and the driving circuit is protected from heat emitted from the LED.

The lens body 3A is constituted by a light transmissive member configured to guide the light L emitted from the light source 2. The light transmissive member may be formed of a material having a refractive index higher than that of air, for example, a transparent resin such as polycarbonate, acryl, or the like, glass, or the like.

The lens body 3A has a projection lens part 5 and a light emission lens part 6, and has a configuration in which the projection lens part 5 and the light emission lens part 6 are integrated such that the projection lens part 5 is located inside the light emission lens part 6 when seen in a front view.

Among these, the projection lens part 5 is constituted by a convex lens 5a, a focal distance of which is adjusted, such that a rear side focus of the convex lens coincides with the light source 2 or the vicinity of the light source. The convex lens 5a is provided to protrude forward from a front surface side (a light emission surface 8, which will be described below) of the light emission lens part 6. Meanwhile, the back surface side of the projection lens part 5 is configured as a flat surface continuous with a back surface side (an incident surface 7, which will be described below) of the light emission lens part 6.

As shown in FIG. 3A, FIG. 3B and FIG. 3C, the projection lens part 5 projects the graphic pattern P obtained by reflecting the form by the light emission of the light source 2 towards the road surface T. Specifically, as shown in FIG. 3A, the light source 2 has a light emission surface 2a with a rectangular shape (in the embodiment, a square shape) when seen in a front view.

As shown in FIG. 3B, the projection lens part 5 projects the light L emitted from the light source 2 toward the road surface T in front thereof. Here, the graphic pattern P having a rectangular shape extending forward and a width gradually increasing toward a side of the road surface T in front is formed by projecting a light source image reflecting the form of the light emission surface 2a of the light source 2 toward a road surface in front thereof.

Further, as shown in FIG. 3C, the form of the graphic pattern P may also be a diamond shape extending toward a side of the road surface T in front according to an orientation in a surface on which the light source 2 is disposed. In addition, the form of the graphic pattern P can be appropriately changed by changing the form of the light emission surface 2a of the light source or disposing a light shielding member (shade) in front of the light emission surface 2a.

Meanwhile, as shown in FIG. 1 and FIG. 2, the light emission lens part 6 is formed in a rectangular flat plate shape, and has the incident surface 7 located on a side opposite to the light source 2 (a back surface side) and the light emission surface 8 located at a side opposite to the incident surface 7 (a front surface side).

The light emission lens part 6 makes the light L emitted from the light source 2 enter thereinto from the incident surface 7, and emits the light L entering from the incident surface 7 to the outside from the light emission surface 8. Accordingly, in the light emission lens part 6, the light L emitted from the light source 2 can cause the light emission surface 8 located around the projection lens part 5 to emit light.

In addition, a light distribution controller 9 configured to control light distribution of the light L emitted from the light emission surface 8 is provided in at least one of the incident surface 7 and the light emission surface 8 (in the embodiment, the light emission surface 8). The light distribution controller 9 has a plurality of light distribution cuts 9a arranged in the widthwise direction of the light emission lens part 6.

In the light emission lens part 6, some of the light L entering the light emission surface 8 is emitted forward obliquely while being refracted by the plurality of light distribution cuts 9a. That is, in the light emission lens part 6, some of the light L emitted from the light emission surface 8 by the light distribution controller 9 can be emitted in a direction different from that of the light L emitted from the projection lens part 5.

In addition, a light diffusion part configured to diffuse the light L emitted from the light emission surface 8 may be provided on at least one of the incident surface 7 and the light emission surface 8. A plurality of diffusion cuts configured to diffuse the light L emitted outward from the light emission surface 8 may be provided in the light diffusion part.

As the diffusion cut, for example, a concavo-convex structure or the like formed by performing lens cutting referred to as flute cut or fish eye cut, knurling, emboss processing, or the like, can be exemplified. In addition, a diffusion degree of the light L emitted from the light emission surface 8 can be controlled by adjusting the form or the like of the diffusion cut.

As described above, in the light-emitting unit TA of the embodiment, it is possible to have a function that performs normal light emission with the light emission lens part 6 and a function that performs road surface drawing with the projection lens part 5 without causing an increase in the number of parts or an increase in the size of the lighting body like in the related art.

Further, in the light-emitting unit TA, as shown in FIG. 4A, while an optical axis AX of the light L emitted from the projection lens part 5 and a vertical line BX of the light emission surface 8 of the light emission lens part 6 are parallel to each other, for example, as shown in FIG. 4B, the optical axis AX of the light L emitted from the projection lens part 5 and the vertical line BX of the light emission surface 8 of the light emission lens part 6 may be non-parallel to each other. Accordingly, in the light emission lens part 6, the light L emitted from the light emission surface 8 can be emitted in a direction different from that of the light L emitted from the projection lens part 5.

Second Embodiment

Next, as a second embodiment of the present invention, for example, a vehicular lamp 100A including a light-emitting unit 1B shown in FIG. 5 to FIG. 8B will be described.

Figure 5:
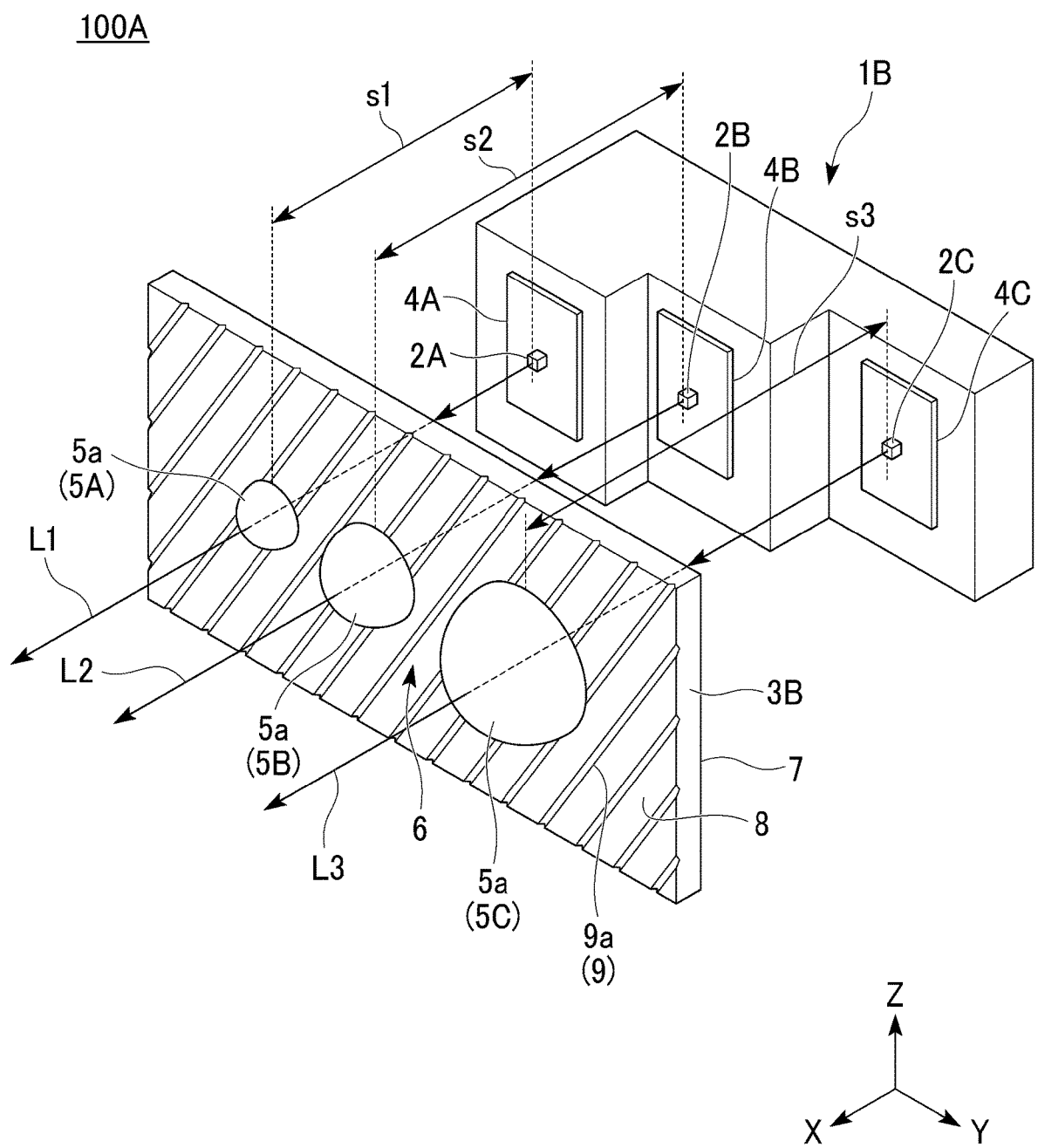
FIG. 5 is a perspective view showing a configuration of a vehicular lamp including a light-emitting unit according to a second embodiment of the present invention.
Figure 6:
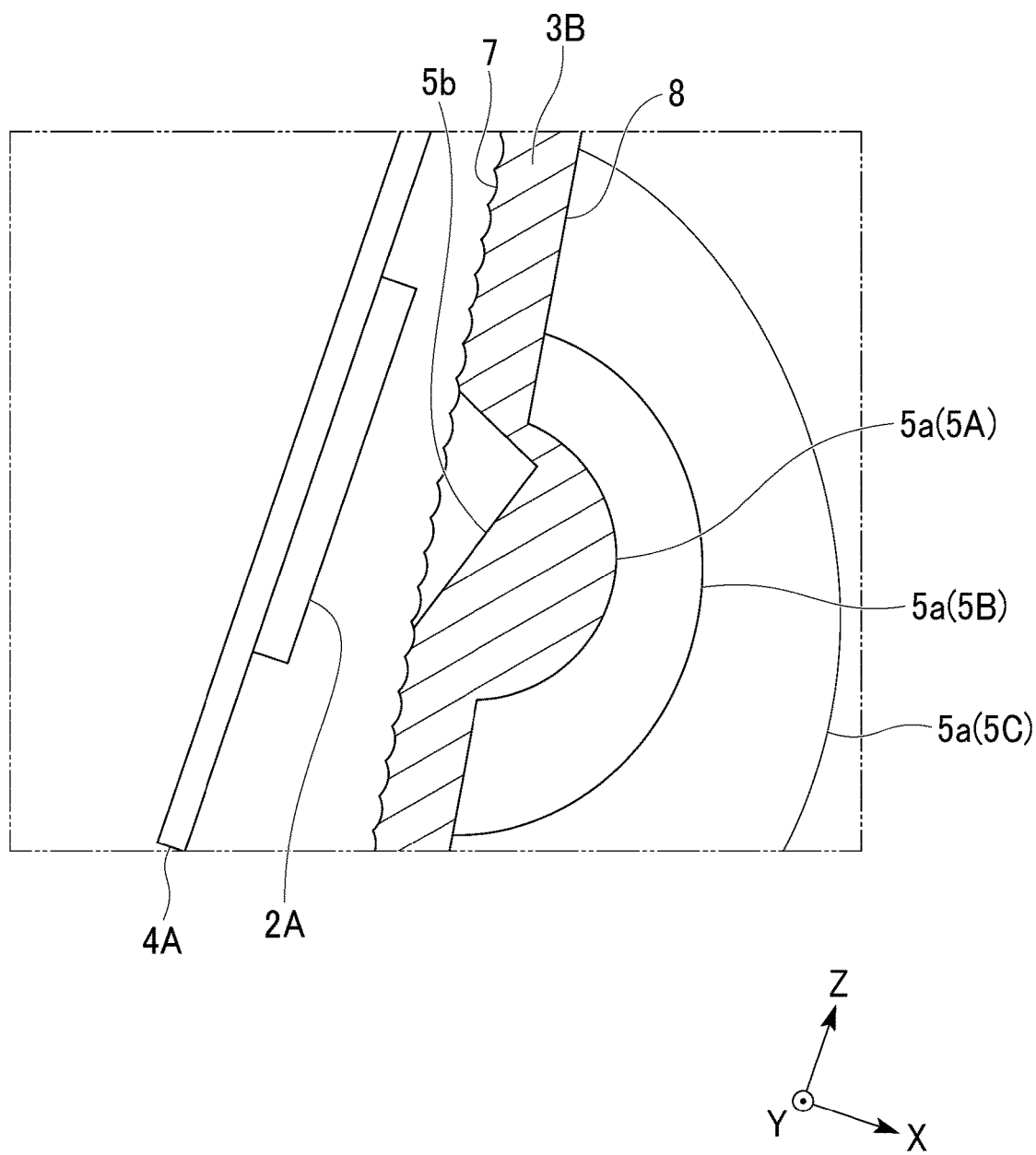
FIG. 6 is an enlarged cross-sectional view of a major part of the light-emitting unit shown in FIG. 5.
Figure 7A:
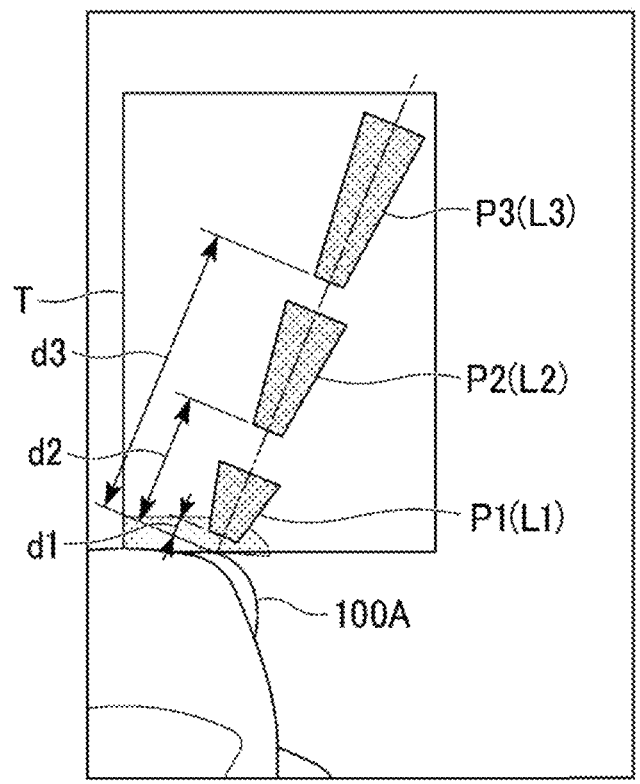
FIG. 7A is a plan view of a plurality of graphic patterns projected toward a road surface from the light-emitting unit shown in FIG. 5.
Figure 7B:
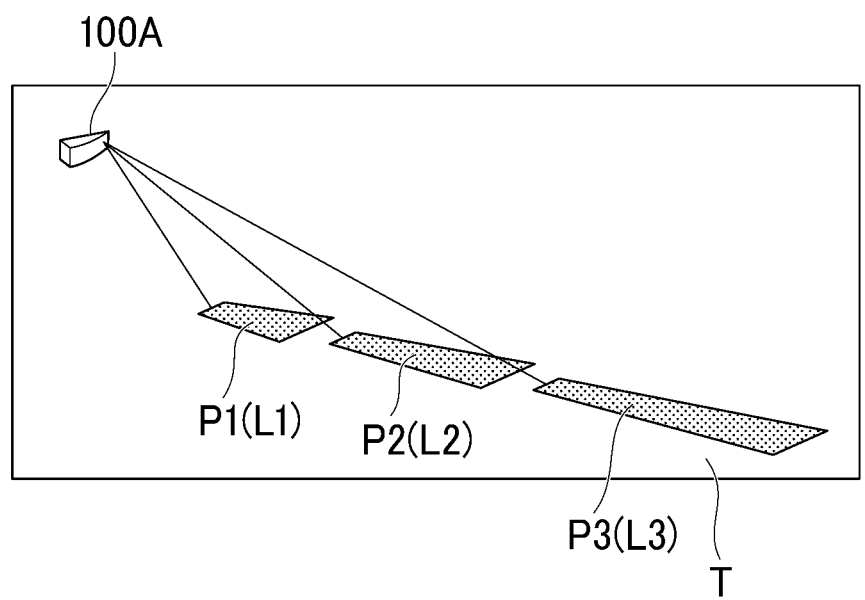
FIG. 7B is a perspective view of a plurality of graphic patterns projected toward a road surface from the light-emitting unit shown in FIG. 5.
Figure 8A:
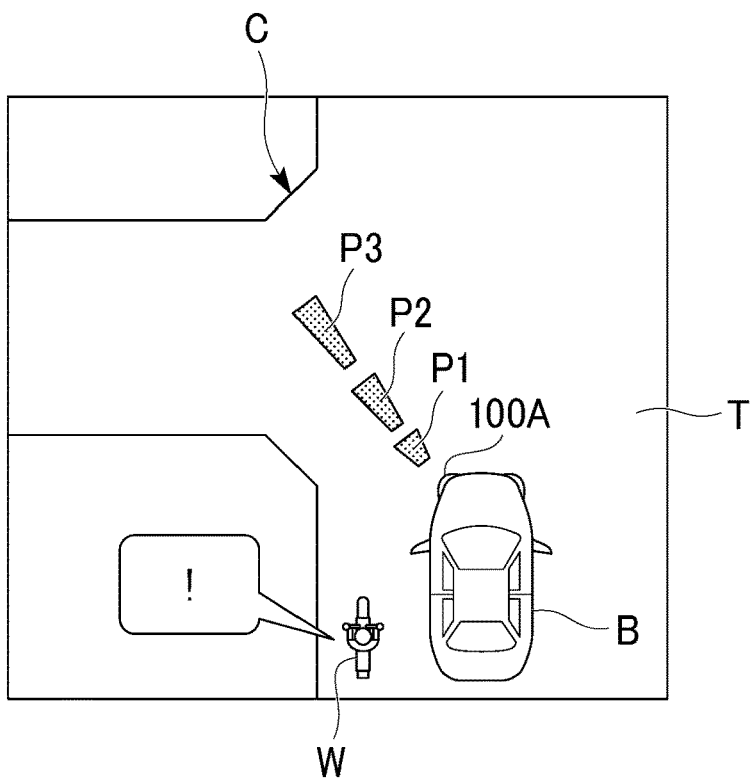
FIG. 8A is a schematic view showing a scene assuming involvement in a collision accident of a vehicle during turning at an intersection.
Figure 8B:
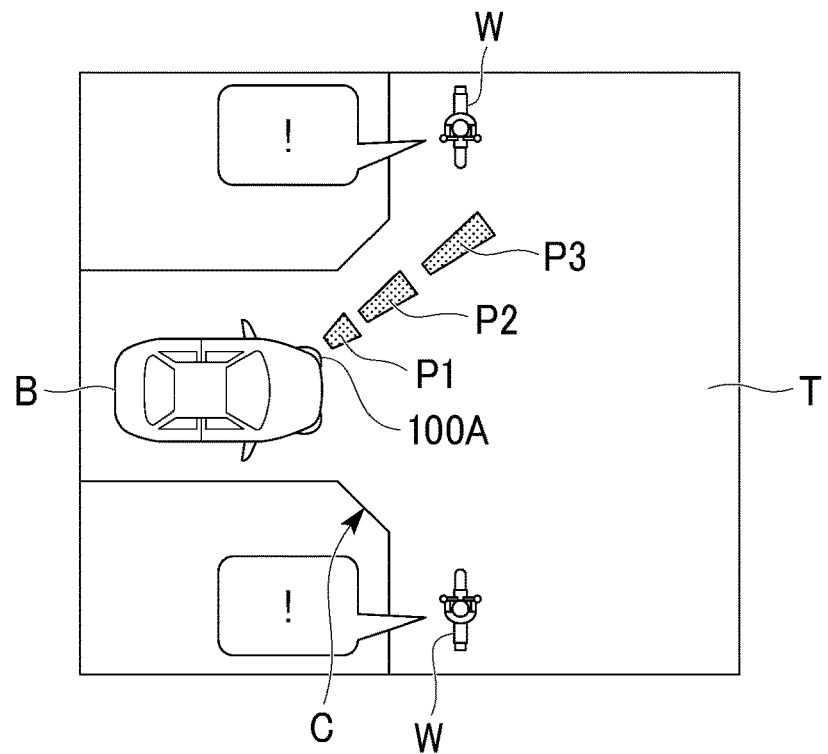
FIG. 8B is a schematic view showing a scene assuming a head-on collision accident of the vehicle during turning at an intersection.

Further, FIG. 5 is a perspective view showing a configuration of the vehicular lamp 100A including the light-emitting unit 1B. FIG. 6 is an enlarged cross-sectional view of a major part of the light-emitting unit 1B. FIG. 7A is a plan view of a plurality of graphic patterns P1, P2 and P3 projected from the light-emitting unit 1B toward the road surface T. FIG. 7B is a perspective view of the plurality of graphic patterns P1, P2 and P3 projected from the light-emitting unit 1B toward the road surface T. FIG. 8A is a schematic view showing a scene assuming involvement in a collision accident of a vehicle B during turning at an intersection C. FIG. 8B is a schematic view showing a scene assuming a head-on collision accident of the vehicle B during turning at the intersection C. In addition, in the following description, the same areas as the light-emitting unit TA are designated by the same reference signs in the drawings and description thereof will be omitted.

In the vehicular lamp 100A including the light-emitting unit 1B of the embodiment, the present invention is applied to direction indicators (turn lamps) that blink through orange light emission among the light-emitting units laterally symmetrically mounted on both corner portions on the front end side (in the embodiment, corner portions on a left front end side) of the vehicle (not shown) as shown in FIG. 5.

Specifically, the light-emitting unit 1B includes a plurality of (in the embodiment, 3) light sources 2A, 2B and 2C, and a lens body 3B disposed in front of the plurality of light sources 2A, 2B and 2C.

The plurality of light sources 2A, 2B and 2C are arranged in one direction in a plane overlapping the lens body 3B when seen in a front view (in the embodiment, in the widthwise direction) in a state in which distances s1, S2 and S3 (in the embodiment, s1<S2<S3) between the light sources and the lens body 3B are different from each other in order.

In the embodiment, as the light sources 2A, 2B and 2C, LEDs configured to emit orange lights (hereinafter, simply referred to as "light") L1, L2 and L3 are used. The light sources 2A, 2B and 2C radially emit the lights L1, L2 and L3 forward (toward the +X axis side) while being mounted on the side of the one surfaces (in the embodiment, front surfaces) of the circuit boards 4A, 4B and 4C, respectively.

The lens body 3B has a plurality of (in the embodiment, 3) projection lens parts 5A, 5B and 5C and the light emission lens part 6, and has a structure in which the plurality of projection lens parts 5A, 5B and 5C and the light emission lens part 6 are integrated such that the plurality of projection lens parts 5A, 5B and 5C are located inside the light emission lens part 6 when seen in a front view.

The plurality of projection lens parts 5A, 5B and 5C are arranged in one direction (in the embodiment, the widthwise direction) in the surface of the lens body 3B while focal distances corresponding to the plurality of light sources 2A, 2B and 2C are adjusted.

In addition, in the plurality of projection lens parts 5A, 5B and 5C, sizes of the convex lenses 5a are different according to the focal distances thereof. Specifically, the convex lens 5a that constitutes the projection lens part 5B is bigger than the convex lens 5a that constitutes the projection lens part 5A, and the convex lens 5a that constitutes the projection lens part 5C is bigger than the convex lens 5a that constitutes the projection lens part 5B.

In the plurality of projection lens parts 5A, 5B and 5C, as shown in FIG. 6, a refractive surface 5b configured to direct the light L emitted from the projection lens part 5A downward is provided on the back surface side of the projection lens part 5A.

As shown in FIG. 7A and FIG. 7B, the plurality of projection lens parts 5A, 5B and 5C project the graphic patterns P1, P2 and P3 that reflect the form through light emission of the plurality of light sources 2A, 2B and 2C toward the road surface T.

Specifically, like the light source 2 shown in FIG. 3A, the plurality of light sources 2A, 2B and 2C have the light emission surfaces 2a (not shown in FIG. 7A and FIG. 7B) with a rectangular shape (in the embodiment, a square shape) when seen in a front view.

As shown in FIG. 7A and FIG. 7B, the plurality of projection lens parts 5A, 5B and 5C project the lights L1, L2 and L3 emitted from the light sources 2A, 2B and 2C toward the road surface T in front thereof. Here, by projecting the light source images that reflect the forms of the light emission surfaces 2a of the light sources 2A, 2B and 2C toward the road surface in front thereof, the graphic patterns P1, P2 and P3 each having rectangular shapes extending toward a side of the road surface T in front and widths enlarged gradually are formed.

In addition, the plurality of graphic patterns P1, P2 and P3 having different projection distances d1, d2 and d3 (in the embodiment, d1<d2<d3) are projected toward the road surface T in sequence. In the vehicular lamp 100A of the embodiment, as shown in FIG. 7A, the plurality of graphic patterns P1, P2 and P3 are projected next to each other from corner portions of a front end side of the vehicle B toward the road surface T obliquely forward and obliquely downward outside the vehicle.

Meanwhile, as shown in FIG. 5, the light emission lens part 6 has basically the same configuration as that of the light emission lens part 6 of the lens body 3A. In the embodiment, some of the light L entering the light emission surface 8 of the light emission lens part 6 is emitted toward a side in front of the vehicle B while being refracted by the plurality of light distribution cuts 9a of the light distribution controller 9.

Accordingly, in the vehicular lamp 100A including the light-emitting unit 1B of the embodiment, the road surface drawing can be performed by performing normal blinking light emission as the turn lamp and projecting the plurality of graphic patterns P1, P2 and P3 toward the road surface T.

In addition, in the vehicular lamp 100A including the light-emitting unit 1B of the embodiment, by repeating lighting operations of sequentially projecting the plurality of graphic patterns P1, P2 and P3 toward the road surface T during lighting of the turn lamp, the road surface drawing that produces a flow of light emission by the plurality of graphic patterns P1, P2 and P3 can also be performed.

Further, as for the lighting operation in which the graphic patterns P1, P2 and P3 are sequentially projected, a method of repeating an operation in which the plurality of graphic patterns P1, P2 and P3 are alternately turned-on one by one in sequence in turn from a state all light emissions are turned-off and then turning off all light emissions, or a method of repeating an operation in which the graphic patterns P1, P2 and P3 are all turned-on by turning on the graphic patterns P1, P2 and P3 one by one in sequence from a state all light emissions are turned-off and then turning off all light emissions, can be exemplified.

Accordingly, in the vehicular lamp 100A of the embodiment, for example, as shown in FIG. 8A, in the scene assuming involvement in the collision accident of the vehicle B during turning at the intersection C, it is possible to call attention to a two-wheeled vehicle W positioned at a dead angle of the vehicle B that the vehicle B is making a turn by using the specific graphic patterns P1, P2 and P3 projected onto the road surface T during lighting of the turn lamp.

In addition, in the vehicular lamp 100A of the embodiment, for example, as shown in FIG. 8B, in the scene assuming the head-on collision accident of the vehicle B during turning at the intersection C, it is possible to call attention to a two-wheeled vehicle W traveling on the approach road a presence of the vehicle B located at a dead angle by using the plurality of graphic patterns P1, P2 and P3 projected onto the road surface T during lighting of the turn lamp.

Third Embodiment

Next, as a third embodiment of the present invention, a vehicular lamp 100B shown in FIG. 9A and FIG. 9B will be described.

Figure 9A:
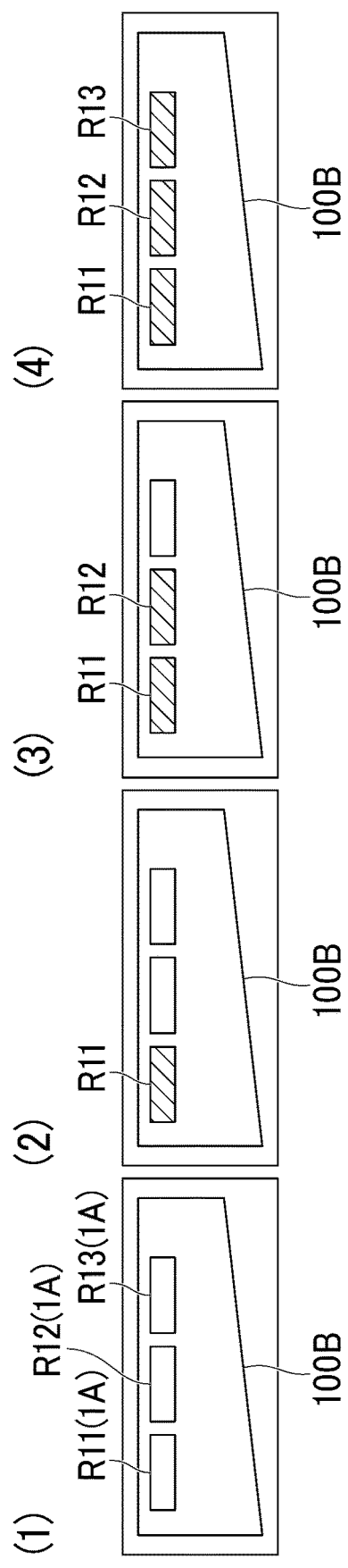
FIG. 9A is a schematic view showing an example of a configuration and a lighting operation of a vehicular lamp according to a third embodiment of the present invention, showing lighting operations of a plurality of light-emitting units in sequence.
Figure 9B:
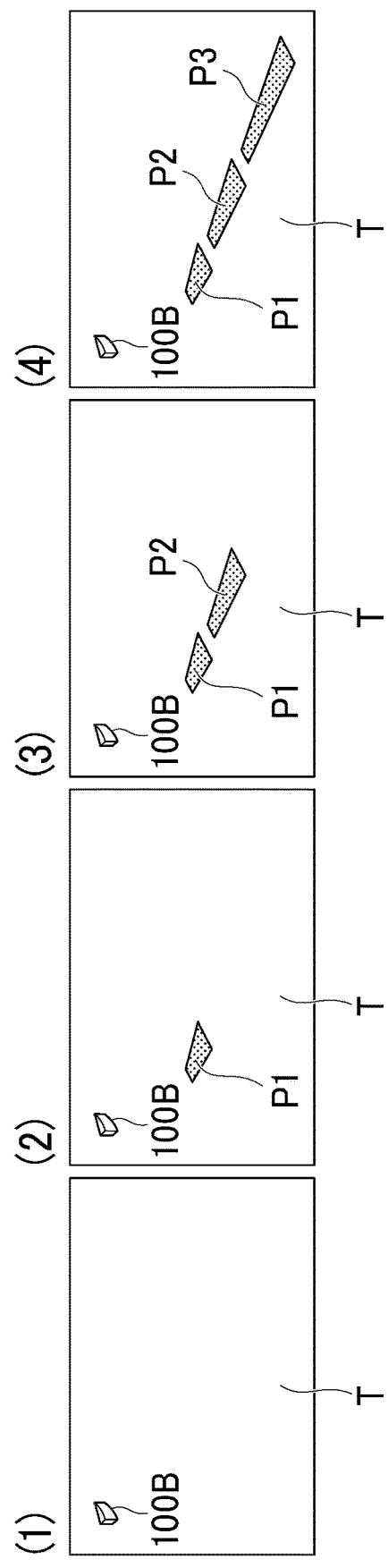
FIG. 9B is a schematic view showing an example of the configuration and the lighting operation of the vehicular lamp according to the third embodiment of the present invention, showing a plurality of graphic patterns projected to a road surface in sequence.

Further, FIG. 9A is a schematic view showing an example of a configuration and a lighting operation of the vehicular lamp 100B, sequentially showing lighting operations of a plurality of light-emitting units R11, R12 and R13, and FIG. 9B is a schematic view showing an example of the configuration and the lighting operation of the vehicular lamp 100B, sequentially showing the plurality of graphic patterns P1, P2 and P3 projected onto the road surface T.

As shown in FIG. 9A, the vehicular lamp 100B of the embodiment includes the plurality of (in the embodiment, 3) light-emitting units R11, R12 and R13 arranged in the widthwise direction of the vehicle B as the turn lamps.

The plurality of light-emitting units R11, R12 and R13 have basically the same configuration as that of the light-emitting unit 1A. Meanwhile, in the plurality of light-emitting units R11, R12 and R13, distances between the light sources 2 and the lens bodies 3A are differentiated in order, and the projection lens parts 5, focal distances of which are adjusted to correspond to the light sources 2, respectively, are disposed. Accordingly, the plurality of light-emitting units R11, R12 and R13 emit light from the light emission lens part 6, and projects the plurality of graphic patterns P1, P2 and P3 with different projection distances from the projection lens part 5 toward the road surface T by arranging them in sequence.

In the vehicular lamp 100B of the embodiment having the above-mentioned configuration, as shown in FIG. 9A and FIG. 9B, during lighting of the turn lamp, a lighting operation in which the light emission lens part 6 is caused to emit light in accordance with the sequential lighting of the plurality of light-emitting units R11, R12 and R13, and sequentially projecting the plurality of graphic patterns P1, P2 and P3 from the projection lens part 5 toward the road surface T is repeated.

Specifically, the lighting operation according to procedures (1) to (4) is repeated in sequence. Among these, the procedure (1) is a state in which the plurality of light-emitting units R11, R12 and R13 are all turned off.

Meanwhile, the procedure (2) is a state in which, by lighting the light-emitting unit R11 among the plurality of light-emitting units R11, R12 and R13, the light emission lens part 6 of the light-emitting unit R11 emits light, and the graphic pattern P1 is projected from the projection lens part 5 of the light-emitting unit R11 onto the road surface T.

Meanwhile, the procedure (3) is a state in which, by lighting the light-emitting units R11 and R12 among the plurality of light-emitting units R11, R12 and R13, the light emission lens parts 6 of the light-emitting units R11 and R12 emit light, and the graphic patterns P1 and P2 are projected from the projection lens parts 5 of the light-emitting units R11 and R12 on to the road surface T.

Meanwhile, the procedure (4) is a state in which, by lighting all the plurality of light-emitting units R11, R12 and R13, the light emission lens parts 6 of the light-emitting units R11, R12 and R13 emit light, and the graphic patterns P1, P2 and P3 are projected from the projection lens parts 5 of the light-emitting units R11, R12 and R13 onto the road surface T.

Accordingly, in the vehicular lamp 100B of the embodiment, during lighting of the turn lamp, a flow of the light emission by the plurality of light-emitting units R11, R12 and R13 can be produced, and the road surface drawing that produces the flow of the light emission by the plurality of graphic patterns P1, P2 and P3 can be performed.

Further, in the vehicular lamp 100B, it is also possible to repeat the operation in which the plurality of light-emitting units R11, R12 and R13 and the plurality of graphic patterns P1, P2 and P3 are alternately turned-on one by one from the state all light emissions are off, and then turning off all light emissions.

Fourth Embodiment

Next, as a fourth embodiment of the present invention, a vehicular lamp 100C shown in FIG. 10A and FIG. 10B will be described.

Figure 10A:
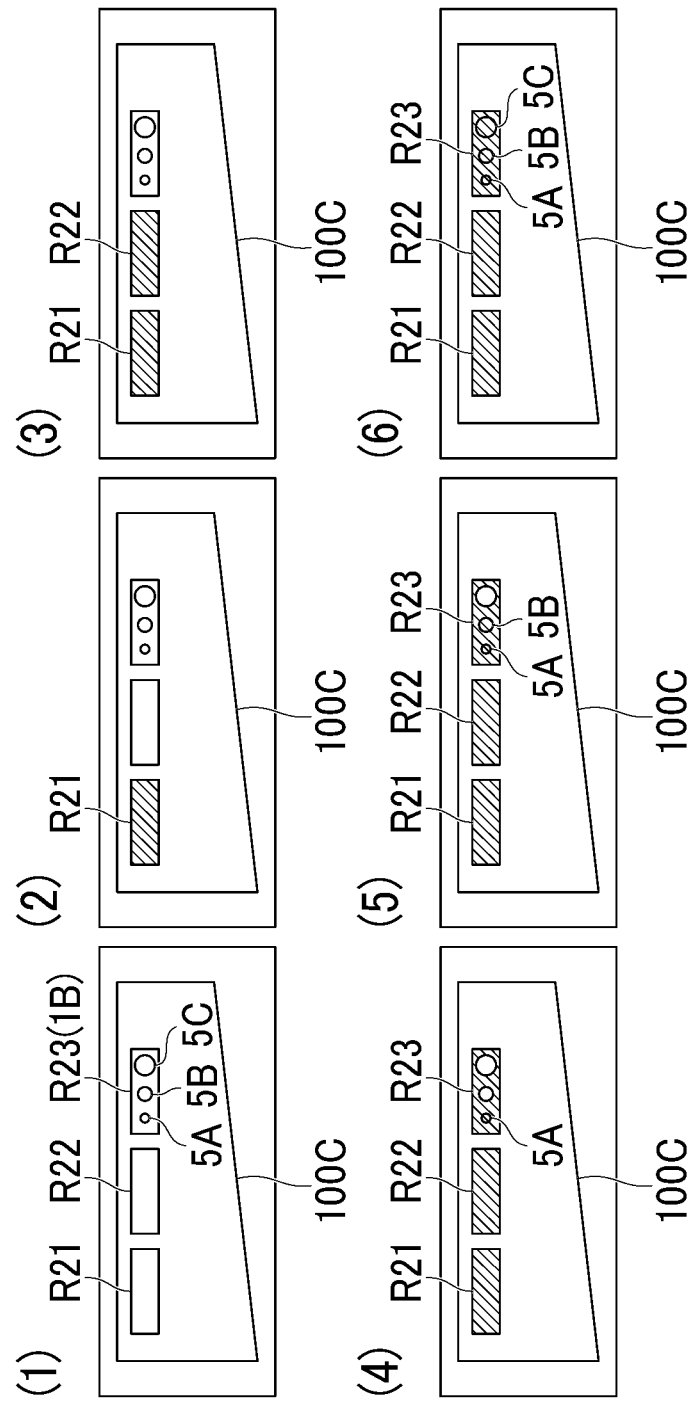
FIG. 10A is a schematic view showing another example of a configuration and a lighting operation of a vehicular lamp according to a fourth embodiment of the present invention, showing lighting operations of a plurality of light-emitting units in sequence.

Further, FIG. 10A is a schematic view showing an example of a configuration and a lighting operation of the vehicular lamp 100C, sequentially showing lighting operations of a plurality of light-emitting units R21, R22 and R23, and FIG. 10B is a schematic view sequentially showing the plurality of graphic patterns P1, P2 and P3 projected onto the road surface T.

As shown in FIG. 10A, the vehicular lamp 100C of the embodiment includes the plurality of (in the embodiment, 3) light-emitting units R21, R22 and R23 arranged in the widthwise direction of the vehicle B as the turn lamps.

Among these, the light-emitting unit 1B is used in the light-emitting unit R23. Meanwhile, the road surface drawing is not be performed in the remaining light-emitting units R21 and R22. That is, the light-emitting units R21 and R22 are equipped with the light source 2 that emits orange light and a light emission lens that emits orange light by the light L emitted from the light source 2 as a whole.

In the vehicular lamp 100C of the embodiment having the above-mentioned configuration, as shown in FIG. 10A and FIG. 10B, during lighting of the turn lamp, a lighting operation in which the plurality of graphic patterns P1, P2 and P3 are sequentially projected toward the road surface T after the plurality of light-emitting units R21, R22 and R23 are sequentially lighted is repeated.

Specifically, the lighting operation is repeated according to the sequence of the procedures (1) to (6). Among these, the procedure (1) is in a state in which all the plurality of light-emitting units R21, R22 and R23 are turned off.

Meanwhile, the procedure (2) is a state in which the light emission lens part 6 of the light-emitting unit R21 emits light by lighting the light-emitting unit R21 among the plurality of light-emitting units R21, R22 and R23.

Meanwhile, the procedure (3) is a state in which the light emission lens parts 6 of the light-emitting units R21 and R22 emit light by lighting the light-emitting units R11 and R12 among the plurality of light-emitting units R21, R22 and R23.

Meanwhile, the procedure (4) is a state in which the graphic pattern P1 is projected from the projection lens part 5A of the light-emitting unit R23 onto the road surface T while the light emission lens parts 6 of the light-emitting units R21, R22 and R23 emit light by lighting all the plurality of light-emitting units R21, R22 and R23.

Meanwhile, the procedure (5) is a state in which the graphic patterns P1 and P2 are projected from the projection lens parts 5A and 5B of the light-emitting unit R23 onto the road surface T while the light emission lens parts 6 of the light-emitting units R21, R22 and R23 emit light by lighting all the plurality of light-emitting units R21, R22 and R23.

Meanwhile, the procedure (6) is a state in which the graphic patterns P1, P2 and P3 are projected from the projection lens parts 5A, 5B and 5C of the light-emitting unit R23 onto the road surface T while the light emission lens parts 6 of the light-emitting units R21, R22 and R23 emit light by lighting all the plurality of light-emitting units R21, R22 and R23.

Accordingly, in the vehicular lamp 100C of the embodiment, during lighting of the turn lamp, a flow of the light emission of the plurality of light-emitting units R11, R12 and R13 can be produced, and the road surface drawing that produces the flow of the light emission by the plurality of graphic patterns P1, P2 and P3 can be performed.

Further, in the vehicular lamp 100C, it is also possible to repeat the operation in which the plurality of light-emitting units R21, R22 and R23 are alternately turned-on one by one in turn from the state alllight emissions are off and then turning off all light emissions, and the operation in which the plurality of graphic patterns P1, P2 and P3 are alternately turned-on one by one in turn when the light-emitting unit R23 is turned on, and then turning off all light emissions.

In addition, in the vehicular lamp 100C, like the vehicular lamp 100B, it is also possible to repeat the lighting operation in which the plurality of graphic patterns P1, P2 and P3 are sequentially projected toward the road surface T in accordance with the sequential lighting of the plurality of light-emitting units R21, R22 and R23 during lighting of the turn lamp.

Further, the present invention is not necessarily limited to the above-mentioned embodiments, and various modifications may be made without departing from the scope of the present invention.

For example, the vehicular lamps 100A to 100C can be installed on bumpers or door mirrors as the turn lamps mentioned above. In addition, the present invention may be applied to a vehicular lamp other than the above-mentioned turn lamp.

Further, although the light-emitting unit to which the present invention is applied is preferably used for the vehicular lamp that constitutes the above-mentioned turn lamp, it is possible to widely apply the present invention to the light-emitting unit that has both a normal light emission function and a road surface drawing function.

As for the light source, other than the above-mentioned LEDs, for example, light emission elements such as laser diodes (LD) can be used. In addition, the color of the light emitted by the light emission element is not limited to the orange light described above, and can be changed as appropriate, such as red light or white light, according to the application of the light source.

Further, although the light-emitting unit to which the present invention is applied is suitably used for the above-described vehicular lamp, it can also be applied to lighting devices other than vehicular lamps.

REFERENCE SIGNS LIST 1A, 1B Light-emitting unit
2, 2A, 2B, 2C Light source
3A, 3B Lens body
4, 4A, 4B, 4C Circuit board
5, 5A, 5B, 5C Projection lens part
6 Light emission lens part
7 Incident surface
8 Light emission surface
9 Light distribution controller
100A, 100B, 100C Vehicular lamp
L Light
P1, P2 and P3 Graphic pattern
R11, R12, R13, R21, R22, R23 Light-emitting unit

The invention claimed is:
1. A light-emitting unit comprising:
a light source; and
a lens body disposed in front of the light source,
wherein the lens body includes:
a projection lens part that is constituted by a convex lens, a focal distance of which is provided such that a rear side focus of the convex lens coincides with the light source or a vicinity of the light source and that is configured to project a graphic pattern, which transmits a form provided by light emission of the light source toward a road surface; and
a light emission lens part configured to surround the projection lens part and emit light from light emitted from the light source,
wherein the light emission lens part includes an incident surface that is located on a side facing the light source and that is configured such that light emitted from the light source enters into the light emission lens part, and a light emission surface that is located on a side opposite to the incident surface and that is configured to emit the light entering from the incident surface to outside,
a side of the projection lens part facing the light source and a side of the light emission lens part facing the light source are both constituted by a flat surface, such flat surface continuous with the incident surface,
the convex lens is provided so as to protrude forward from the light emission surface from the side opposite to the incident surface, and
at least some of light emitted from the light emission surface is emitted in a direction different from a direction of light emitted from the projection lens part.

2. The light-emitting unit according to claim 1, wherein a light distribution controller, which provides an arrangement configured to control light distribution of some light entering the light emission surface in a direction different from that of light emitted from the projection lens part, is provided on at least one of the incident surface and the light emission surface.

3. The light-emitting unit according to claim 2, wherein a light diffusion part configured to diffuse light emitted from the light emission surface is provided on at least one of the incident surface and the light emission surface.

4. The light-emitting unit according to claim 1, wherein a plurality of the light sources are disposed in a plane which overlaps the lens body, when seen in a front view, such that distances from each of the light sources and the lens body are different,
a plurality of the projection lens parts are disposed in a surface of the lens body such that a respective focal distance is adjusted in accordance with each of the light sources, and
a plurality of graphic patterns having different projection distances toward the road surface are projected next to each other.

5. A vehicular lamp configured to produce a sequential pattern of light emission by a plurality of light-emitting units by sequentially lighting the plurality of light-emitting units arranged in a widthwise direction of a vehicle, the vehicular lamp comprising the light-emitting unit according to claim 4,
wherein the vehicular lamp is configured to provide a lighting operation in which, after the plurality of light-emitting units are sequentially lighted, a plurality of graphic patterns having different projection distances are sequentially projected toward the road surface in a repetitive manner.

6. A vehicular lamp configured to produce a sequential pattern of light emission by a plurality of light-emitting units by sequentially lighting the plurality of light-emitting units arranged in a widthwise direction of a vehicle, the vehicular lamp comprising the light-emitting unit according to claim 1,
wherein the vehicular lamp is configured to provide a lighting operation in which, according to sequential lighting of the plurality of light-emitting units, a plurality of graphic patterns having different projection distances are sequentially projected toward the road surface in a repetitive manner.

7. The light-emitting unit according to claim 1, wherein the lens body has the projection lens part and the light emission lens part such that the projection lens part is located inside the light emission lens part when seen in a front view.

8. A light-emitting unit comprising:
a light source; and
a lens body disposed in front of the light source,
wherein the lens body includes:
a projection lens part that is constituted by a convex lens, a focal distance of which is provided such that a rear side focus of the convex lens coincides with the light source or a vicinity of the light source and that is configured to project a graphic pattern, which transmits a form provided by light emission of the light source toward a road surface; and
a light emission lens part configured to surround the projection lens part and emit light from light emitted from the light source,
wherein the light emission lens part includes an incident surface that is located on a side facing the light source and that is configured such that light emitted from the light source enters into the light emission lens part, and a light emission surface that is located on a side opposite to the incident surface and that is configured to emit the light entering from the incident surface to outside,
a side of the projection lens part facing the light source is constituted by a flat surface and a side of the light emission lens part facing the light source is constituted by one of a flat surface and a surface with diffusion cuts, and the side of the light emission lens part facing the light source extends from the flat surface of the side of the projection lens part facing the light source,
the convex lens is provided so as to protrude forward from the light emission surface from the side opposite to the incident surface, and
at least some of light emitted from the light emission surface is emitted in a direction different from a direction of light emitted from the projection lens part.

9. The light-emitting unit according to claim 8, wherein a plurality of the light sources are disposed in a plane which overlaps the lens body, when seen in a front view, such that distances from each of the light sources and the lens body are different,
a plurality of the projection lens parts are disposed in a surface of the lens body such that a respective focal distance is adjusted in accordance with each of the light sources,
among sides of the projection lens parts facing the light sources and sides of the light emission lens parts facing the light sources, a refractive surface configured to direct light emitted from the projection lens part downward is provided in a surface that overlaps with at least one of the plurality of projection lens parts when seen in the front view, and
a plurality of graphic patterns having different projection distances toward the road surface are projected next to each other.

10. A vehicular lamp configured to produce a sequential pattern of light emission by a plurality of light-emitting units by sequentially lighting the plurality of light-emitting units arranged in a widthwise direction of a vehicle, the vehicular lamp comprising the light-emitting unit according to claim 9,
wherein the vehicular lamp is configured to provide a lighting operation in which, after the plurality of light-emitting units are sequentially lighted, a plurality of graphic patterns having different projection distances are sequentially projected toward the road surface in a repetitive manner.

11. A vehicular lamp configured to produce a sequential pattern of light emission by a plurality of light-emitting units by sequentially lighting the plurality of light-emitting units arranged in a widthwise direction of a vehicle, the vehicular lamp comprising the light-emitting unit according to claim 8,
wherein the vehicular lamp is configured to provide a lighting operation in which, according to sequential lighting of the plurality of light-emitting units, a plurality of graphic patterns having different projection distances are sequentially projected toward the road surface in a repetitive manner.

* * * * *